United States Patent Office 3,540,894
Patented Nov. 17, 1970

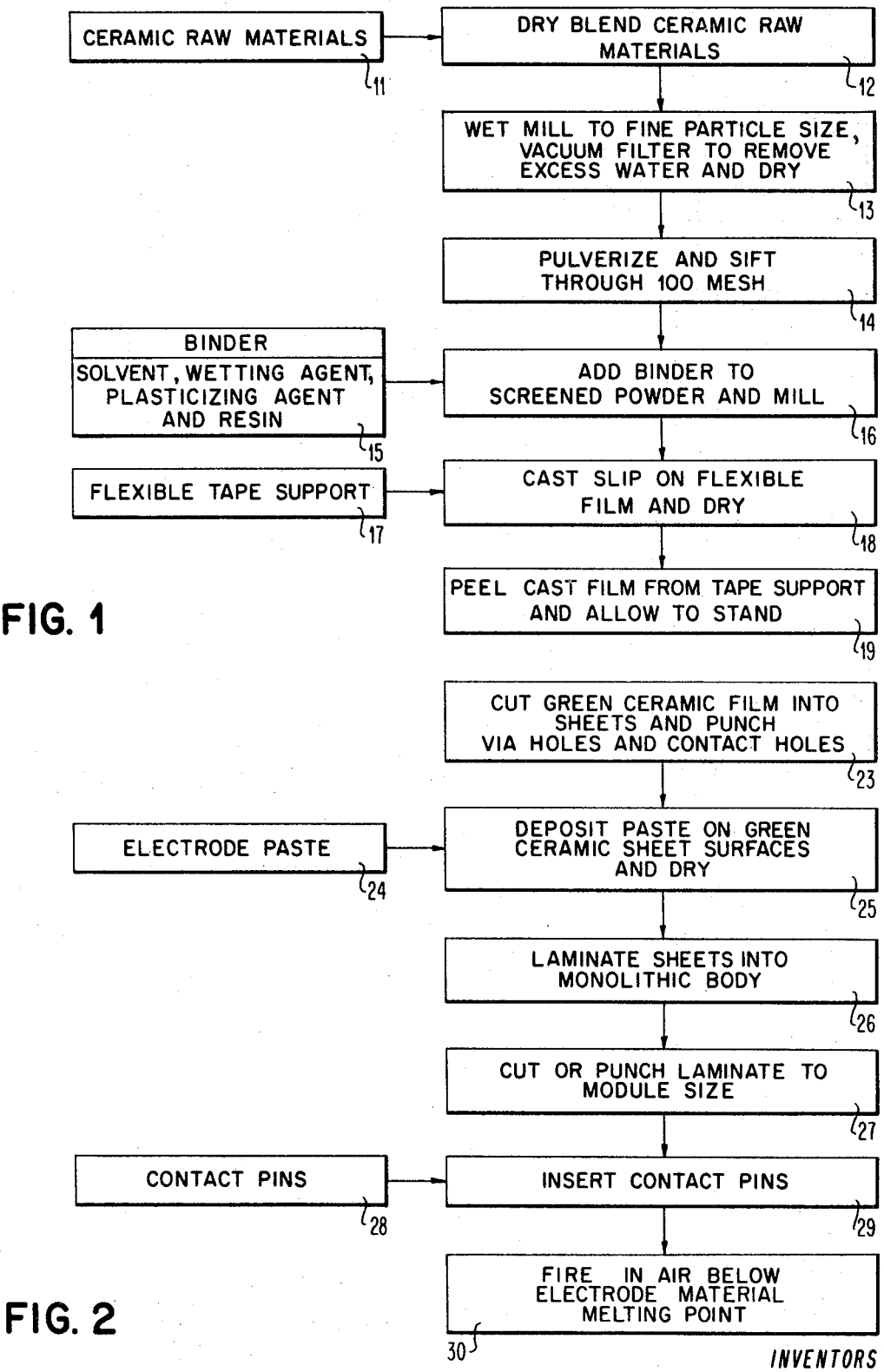

3,540,894
EUTECTIC LEAD BISILICATE CERAMIC COMPOSITIONS AND FIRED CERAMIC BODIES
Charles M. McIntosh, Fishkill, N.Y., assignor to International Business Machines Corporation, Armonk, N.Y., a corporation of New York
Filed Mar. 29, 1967, Ser. No. 626,788
Int. Cl. C04b 33/00
U.S. Cl. 106—39   4 Claims

ABSTRACT OF THE DISCLOSURE

A composition which forms a dense ceramic body at low firing temperatures has the following major constituents: a low melting point lead bisilicate vitreous phase; and a suspending agent made up of a bentonite clay and a ball or kaolinite clay. A major crystalline phase selected from the group consisting of $Al_2O_3$, $ZnZrSiO_5$ and $CaSiO_3$ is also included.

The composition, because of its low firing temperature, low shrinkage and adaptability to slip-casting, doctor-blading processes and other thin film processing, finds particular utility in fabricating microelectronic, multilevel ceramic modules.

BACKGROUND OF THE INVENTION

The present invention relates to ceramic compositions, and in particular to low temperature firing, low shrinkage compositions suitable for use in multilevel, microelectronic structures employing fired ceramic bodies.

The advances presently being made in microelectronic devices are being deterred by certain inherent limitations in existing designs. The single insulating substrate, typically ceramic, with deposits of conductive material on one or both sides allows only limited conductive patterns.

In efforts to achieve more complex, i.e., dense, circuitry, one approach has been to stack a plurality of such substrates, spaced from one another for insulation purposes. Such an approach has proved to be unfeasible because of difficulty in electrically joining the patterns on the separated substrates, and in final assembly. A second difficulty is the exposure of the conductive pattern to atmospheric effects. A third difficulty is the additional volume required by the use of separated substrates.

A second approach has been to use multilevel ceramic structures, composite ceramic bodies having electrically connected conductive patterns that may exist at a plurality of distinct, horizontal levels.

A common method for fabricating such multilevel ceramic structures requires: forming ceramic material into green sheets; forming vertical via holes at predetermined locations in the separate sheets; depositing electrode paste on the desired areas of the separate sheets and in the via holes; stacking the sheets one upon another and subjecting them to either moderate temperature and pressure or just to very high pressure for a period of time long enough to laminate the sheets; and, subjecting the laminate to ceramic firing temperatures to mature the ceramic and simultaneously fire the screened paste.

One difficulty encountered with this approach is that at the temperatures required to bond the separate ceramic sheets together, typically 1200–1350° C. and higher, the more highly conductive electrode materials such as copper and silver with melting points of 1083° C. and 960.5° C., respectively, melt so that one is limited to using more expensive, less conductive materials such as platinum and palladium, which do not melt at these bonding temperatures. A second difficulty is that of shrinkage of the ceramic material which cannot be controlled and may result in mismatch between the via holes in separate sheets. A third difficulty is the existence of voids and pinholes in presently available ceramic materials which can give rise to shorts between superimposed conductors located on adjacent horizontal levels.

One object of the present invention is a composition which can be fired dense in air at a low temperature and over a wide firing range.

Another object is such a composition which possesses a low, linear coefficient of thermal expansion.

Still another object is such a composition which is adaptable to doctor blading-slip casting processing or other thin film deposition methods.

A further object is such a composition which when cast can be stacked and fired into bodies for use in multilevel microelectronic circuitry where extremely close dimensional tolerances, low dielectric constant, smooth surface finish and low dielectric losses are required.

SUMMARY OF THE INVENTION

In accordance with the teachings of the present invention, there is provided a ceramic composition which has the following major constituents: a low melting point lead bisilicate vitreous phase; and, a suspending agent made up of a bentonite clay and a kaolinite clay, or ball clay to improve processing properties. The bentonite impurities are also utilized for their fluxing properties. A minor crystalline phase selected from the group consisting of $Al_2O_3$, $ZnZrSiO_5$ and $CaSiO_3$ are added to improve the dielectric and thermal properties.

The composition is fired to form a dense ceramic body. The resulting fired body has the following major constituents:

| Constituent— | Weight percent |
|---|---|
| PbO | 40–55 |
| $Al_2O_3$ | 8–17 |
| $SiO_2$ | 20–40 |

The above major constituents total 85–95, weight percent, of the total body.

In addition, to the above constituents various low melting point oxide impurities for lowering the firing temperatures are present, as follows:

| Constituent— | Weight percent |
|---|---|
| CaO | 0.45–3.50 |
| $K_2O$ | 0.06–0.81 |
| MgO | 0.39–0.50 |
| $Na_2O$ | 0.04–0.05 |
| ZnO | 0.00–1.45 |
| FeO | 0.00–0.02 |
| $Fe_2O_3$ | 0.49–0.61 |
| $TiO_2$ | 0.03–0.17 |
| $ZrO_2$ | 0.00–2.64 |

BRIEF DESCRIPTION OF THE DRAWING

The foregoing and other objects, features and advantages of the present invention will be apparent from the following more particular description of the present invention and accompanying drawing wherein FIGS. 1 and 2 are a flow diagram illustrating the operations performed and materials used in fabricating a multilevel ceramic body or module according to the present invention.

DESCRIPTION OF THE PREFERRED EMBODIMENTS

A wide variety of multilevel ceramic structures can be made using the novel compositions of the present invention. The fabrication of one such structure will first be described.

Referring now to FIG. 1, the ceramic raw materials 11 of the present invention are dry blended for approximately thirty minutes in operation 12. Following this, in operation 13, the particles are wet milled to fine particle size, typically 0.2 micron, vacuum filtered to remove excess water and then allowed to dry. In the next step, designated operation 14, the material is pulverized so that all particles will pass through a minus 100 mesh screen. Then, an organic binder 15 consisting of a solvent, typically alcohol, toluene, etc., a wetting agent, typically tergitol, a plasticizing agent typically dibutyl phthalate, and an organic resin typically polyvinyl butyral are added to the powder resulting from the previous operation in an approximate 1.3 to 1 powder to binder ratio, and milled, to form, in operation 16, a homogeneous suspension. During the milling operation which lasts approximately 15 hours, the casting, as the suspension is now referred to, is checked for its viscosity, specific gravity and on a paint gauge to detect agglomerates. The specific gravity ranges from 1.47 to 1.56 gms./cc. while viscosity is approximately 2900 centipoises. With the milling completed, the slip, is ready to be cast.

The slip is deposited on a flexible moving tape support 17 for example, a 5 mil thick Mylar film. The support is clean, smooth and has an impervious surface. The slip is spread and levelled by means of a doctor blade into a thin layer or film, and then dried in situ at room temperature for approximately four hours in operation 18. Ninety to one hundred fifteen grams of the slip material can be cast to provide one film 48" long x 6" wide x 0.0058" thick.

In the next operation, designated 19, the cast film is peeled from the tape support and checked for thickness and pin holes, pliability and color change. The peeled film is then allowed to stand for an additional forty-eight hours to assure that all volatile constituents have evaporated from the film. Assuming that the steps have been carried out properly, the cast film will be pinhole free, of uniform thickness ±½ mil and have an optimized green density of 1.76 to 1.88. The cast film, referred to as being in its green state, is now ready for further processing.

Referring now to FIG. 2, the cast green ceramic film is cut into sheets, typically 6" x 2" and punched at predetermined locations in operation 23 by running it through a punch press to provide via holes and pin contact holes. The punched holes will be filled with conductive material for electrically connecting the conductive patterns to be located at distinct horizontal levels within the to be formed monolithic ceramic structure.

Electrode paste 24, for example, silver, gold, gold-platinum, gold-palladium, silver-palladium, ternary alloys and the like, is deposited in operation 25 as by silk screening, spraying, plating or pouring, etc., on the desired surfaces of the separate green ceramic sheets, to form a desired circuit pattern, ground plane, voltage plane, etc. A portion of the paste is squeezed into the previously punched holes. The paste is then allowed to dry. Typical drying time and temperature are 10 minutes at 100° C. If desired, resistors, inductors, capacitors, etc. can be screened on during this operation. In one embodiment resistors were screened one layer from the outer layer and a window was punched in the outer layer so the resistor could be later trimmed to the desired tolerance values, by abrasion.

In the next operation, designated 26, the green ceramic sheets, typically four to six, are stacked one upon another with via holes in registry where desired, and subjected to moderate temperature and pressure between the platens of a press for a period of time long enough to laminate the sheets into a monolithic body. A typical lamination cycle calls for holding the stack at 175° F. and 100 p.s.i. for 5 minutes and then raising the pressure to 800 p.s.i. for 5 minutes. The two step cycle permits any last volatiles to seep out from between lamina and thus prevent the formation of voids. The laminate is then removed from the press.

In operation 27, the laminate is cut to desired module size, typically 1" x 1". Glass beaded contact pins 28, typically an iron-nickel cobalt alloy, i.e., Kovar, or a silver alloy, e.g., Consil 995 manufactured by Handy & Harman of New York, N.Y., are inserted into previously metallized surfaces of the contact holes in operation 29. This completes conductive paths on internal laminas to external circuitry.

Thereafter, in the final operation, designated 30, the composite structure is fired in air, at the maturing point of the ceramic material which is below the melting point of the conductive material of the electrode paste 24. The total firing cycle is carried on for approximately 15 hours, the effect of which is to: burn off the binder and any remaining volatile constituents, typically at the 500–600° C. region; mature or vitrify the body; fire the screened electrodes and intimately bond them to the ceramic; and glass in the pin contacts. The four or more layer structure or module fires to a flat body whose thickness ranges between 0.020" to 0.024" for this number of layers. Increasing the number of layers in the module improves module flatness.

It is believed that the present invention will be more fully appreciated in light of the following examples. Table I sets forth the ingredients and percentages, by weight, of specific examples of fired ceramic bodies whose compositions fall within the teachings of the present invention.

TABLE I

| Constituents | Weight percentage of selected ceramic bodies | | | | | |
| --- | --- | --- | --- | --- | --- | --- |
|  | 1 | 2 | 3 | 4 | 5 | 6 |
| PbO | 44.02 | 44.02 | 41.56 | 52.65 | 50.20 | 41.90 |
| $Al_2O_3$ | 12.80 | 8.06 | 12.20 | 12.90 | 14.59 | 16.94 |
| $SiO_2$ | 37.62 | 38.70 | 37.03 | 21.50 | 21.76 | 36.14 |
| CaO | 0.46 | 0.45 | 0.45 | 3.43 | 3.23 | 0.46 |
| $K_2O$ | 0.64 | 0.64 | 0.63 | 0.81 | 0.77 | 0.06 |
| MgO | 0.39 | 0.39 | 0.39 | 0.50 | 0.47 | 0.39 |
| $Na_2O$ | 0.04 | 0.04 | 0.04 | 0.05 | 0.04 | 0.04 |
| ZnO |  | 1.45 | 1.45 |  |  |  |
| FeO |  |  |  | 0.02 | 0.02 |  |
| $Fe_2O_3$ | 0.49 | 0.48 | 0.48 | 0.61 | 0.58 | 0.49 |
| $TiO_2$ | 0.17 | 0.03 | 0.03 | 0.04 | 0.04 | 0.03 |
| $ZrO_2$ |  | 2.20 | 2.19 |  | 2.64 |  |
| $H_2O$ |  |  | Balance |  |  |  |

For the preparation of the ceramic compositions listed in Table I, the raw materials listed in Table II were used:

TABLE II

| Raw material | Parts, by weight, of raw materials | | | | | |
| --- | --- | --- | --- | --- | --- | --- |
|  | 1 | 2 | 3 | 4 | 5 | 6 |
| Lead bisilicate #1 | 68.6 | 68.6 |  |  |  |  |
| Clay #1 | 13.3 | 13.3 | 13.3 | 13.3 | 13.3 | 13.3 |
| Alumina #1 | 4.8 |  |  |  |  |  |
| Clay #2 | 13.3 | 13.3 | 13.3 | 13.3 | 13.3 | 13.3 |
| $ZnZrSiO_5$ |  | 4.8 | 4.8 |  | 4.8 |  |
| Lead bisilicate #2 |  |  | 68.6 | 68.6 | 68.6 | 68.6 |
| $CaSiO_3$ #1 |  |  |  | 4.8 | 4.8 |  |
| Alumina #2 |  |  |  |  |  | 4.8 |

Lead bisilicate #1 has the empirical formula:

$$1.00\ PbO \quad 0.03\ Al_2O_3 \quad 1.95\ SiO_2$$

and a molecular weight of 343.39. It lowers the firing temperature of the glaze, extends the firing temperature range and provides self glazing. The self glazing provides the desired surface finish for the deposited electrode materials.

Clay #1 is a bentonite having the empirical formula:

$$0.0139\ Na_2O \quad\quad\quad\quad\quad\quad 6.2735\ SiO_2$$
$$0.2805\ K_2O \quad 1.000\ Al_2O_3$$
$$0.3521\ CaO \quad 0.1215\ Fe_2O_3$$
$$0.4160\ MgO \quad\quad\quad\quad\quad\quad 4.0063\ H_2O$$

and a molecular weight of 573.30. Bentonite clays contain large percentages of alkali, alkaline earth and ferric oxides. These oxides are all excellent fluxing agents and appreciably contribute to lowering of the firing temperatures.

Alumina #1 has the empirical formula:

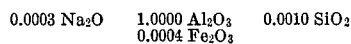

and a molecular weight of 102.08.

Clay #2 is a kaolinite having the empirical formula:

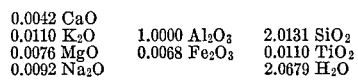

and a molecular weight of 264.41.

Similar results are achieved but with somewhat lower shrinkage where Clay #2 is in whole or in part a ball clay having the empirical formula:

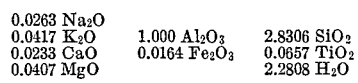

and a molecular weight of 540.68.

Likewise, Clay #2 can be, in whole or in part, a kaolinite having the empirical formula:

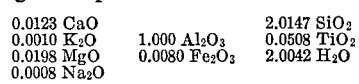

and a molecular weight of 266.42.

The kaolinites' plasticity, fine particle size and casting properties makes them a desirable additive to bodies to be fabricated via the doctor-blading/slip-casting process.

Lead bisilicate #2 is a eutectic lead bisilicate having the empirical formula:

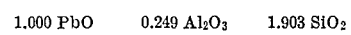

1.000 PbO    0.249 $Al_2O_3$    1.903 $SiO_2$ and a molecular weight of 362.88.

The eutectic lead bisilicate improved the fired body surface finish in all bodies in which it was used.

$CaSiO_3$ #1 has the empirical formula:

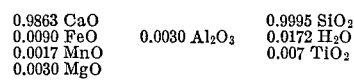

and a molecular weight of 117.34.

ent invention had an average density of 3.37, a linear thermal coefficient of expansion of about $56 \times 10^{-7}$ cm./cm./° C. and thermal conductivity of $2-3 \times 10^{-3}$ c.g.s. units.

While the invention has been particularly shown and described with reference to the preferred embodiments thereof, it will be understood by those skilled in the art that the foregoing and other various changes in form and details may be made therein without departing from the spirit and scope of the invention.

What is claimed is:

1. A composition which forms a dense ceramic body when fired in the temperature range of 750–900° C. consisting essentially of:

eutectic lead bisilicate vitreous phase having the empirical formula 1.000 PbO 0.249 $Al_2O_3$ 1.903 $SiO_2$:
   a suspending agent made up of a mixture of clays of which substantially one-half by weight of said mixture is a bentonite clay and the remainder is selected from the group consisting of a ball clay and a kaolinite clay; and
   a crystalline phase selected from the group consisting of $Al_2O_3$, $ZnZrSiO_5$ an $CaSiO_3$.

2. The composition according to claim 1 including, in parts, by weight:

Eutectic lead bisilicate _____ 68.6
Bentonite clay _____ 13.3
Kaolinite clay _____ 13.3
Alumina _____ 4.8

3. A dense ceramic body, consisting essentially of a composition:
   (A) fired in the temperature range of 750–900° C. and
   (B) consisting essentially of,
      (a) eutectic lead bisilicate having the empirical formula 1.000 PbO 0.249 $Al_2O_3$ 1.903 $SiO_2$,
      (b) a clay mixture consisting of bentonite and a clay selected from the group of kaolin and ball clay, and

TABLE III.—EFFECT OF VARYING COMPOSITION ON PROPERTIES OF CERAMIC BODIES FORMED

| Firing temperature, ° C. | Density | Smoothness, RMS microinches | Shrinkage, percent | Dielectric constant at 1 kc. | Shape | Dissipation factor, at 1 kc. |
|---|---|---|---|---|---|---|
| 760 | Good | Good, 41 | Linear, 5 | 6.2 | Flat, square | |
| 952 | do | Good | Linear | | do | |
| 760 | Very dense | Excellent, 26 | Linear, 12.1 | 7.60–7.75 | Very flat, square | 0.0020–0.0025 |
| 765–785 | do | Excellent, 35 | Linear, 11.3 | 7.60 | do | 0.0015 |
| 775–795 | do | Excellent, 32 | Linear, 10.7 | 7.25–7.40 | do | 0.0015–0.0017 |
| 815–900 | do | Excellent, 28 | Linear, 10.2 | 7.30–7.40 | do | 0.0015 |

Alumina #2 has the empirical formula:

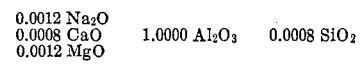

and a molecular weight of 101.15.

These ray materials were mixed with an organic binder consisting of a solvent, a wetting agent, plasticizing agent and milled into a slip. The slip was cast into thin films and the green films were cut into sheets. Four or more green sheets were then stacked, laminated and fired. Significant properties of the fired ceramic bodies so formed are listed in Table III.

Calcining the ceramic raw materials in all instances had the effect of improving dissipation factor and dielectric constant and of further lowering shrinkage.

Bodies produced by following the teachings of the pres- (c) a compound selected from the group consisting of $Al_2O_3$, $ZnZrSiO_5$ and $CaSiO_3$.

4. The dense ceramic body of claim 3, whose composition is in parts by weight:

PbO _____ 40–55
$Al_2O_3$ _____ 8–17
$SiO_2$ _____ 20–40
CaO _____ 0.45–3.50
$K_2O$ _____ 0.06–0.81
MgO _____ 0.39–0.50
$Na_2O$ _____ 0.04–0.05
ZnO _____ 0.00–1.45
FeO _____ 0.00–0.02
$Fe_2O_3$ _____ 0.49–0.61
$TiO_2$ _____ 0.03–0.17
$ZrO_2$ _____ 0.00–2.64

(References on following page)

References Cited

UNITED STATES PATENTS

| | | | |
|---|---|---|---|
| 1,749,642 | 3/1930 | Mellor | 106—45 |
| 2,803,554 | 8/1957 | Fenity et al. | 106—39 X |
| 2,836,501 | 5/1958 | Crownover | 106—39 |
| 2,898,217 | 8/1959 | Selsing | 106—46 |
| 3,125,618 | 3/1964 | Levinson | 106—39 X |
| 3,293,077 | 12/1966 | Kaiser et al. | 106—39 X |

OTHER REFERENCES

Ceramic Raw Materials, in Ceramic Industry Magazine, 86, (Cahner's Publ.) January 1966, pp. 118 and 163.

Section 7—Bodies, in Lead in the Ceramic Industries (Publ. by Lead Industries Association), November, 1956, pp. 1–10.

Norton, F.H., Elements of Ceramics, Cambridge, Mass. (Wesley Press), 1952, pp. 32–34, 121, 123.

Norton, F.H., Refractories, New York (McGraw-Hill), 1949, pp. 32–36.

Ceramic Raw Materials, in Ceramic Industry Magazine, 86, (Cahner's Publ.), January, 1966, p. 74.

HELEN M. McCARTHY, Primary Examiner

W. R. SATTERFIELD, Assistant Examiner

U.S. Cl. X.R.

106—46; 264—61